United States Patent
Chen et al.

(10) Patent No.: US 11,809,291 B2
(45) Date of Patent: *Nov. 7, 2023

(54) METHOD AND APPARATUS FOR REDUNDANCY IN ACTIVE-ACTIVE CLUSTER SYSTEM

(71) Applicant: Huawei Technologies Co., Ltd., Shenzhen (CN)

(72) Inventors: Yijia Chen, Chengdu (CN); Hui Liu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

This patent is subject to a terminal disclaimer.

(21) Appl. No.: 17/529,770

(22) Filed: Nov. 18, 2021

(65) Prior Publication Data

US 2022/0075698 A1 Mar. 10, 2022

Related U.S. Application Data

(63) Continuation of application No. 16/839,205, filed on Apr. 3, 2020, now Pat. No. 11,194,679, which is a
(Continued)

(30) Foreign Application Priority Data

Oct. 30, 2015 (CN) .......................... 201510727389.4

(51) Int. Cl.
| | |
|---|---|
| *G06F 11/00* | (2006.01) |
| *G06F 11/20* | (2006.01) |
| *G06F 11/14* | (2006.01) |
| *G06F 3/06* | (2006.01) |

(52) U.S. Cl.
CPC ...... *G06F 11/2025* (2013.01); *G06F 11/1425* (2013.01); *G06F 11/2033* (2013.01);
(Continued)

(58) Field of Classification Search
CPC ......................... G06F 11/2025; G06F 11/2033
See application file for complete search history.

(56) References Cited

U.S. PATENT DOCUMENTS

| | | | |
|---|---|---|---|
| 5,673,384 | A | 9/1997 | Hepner et al. |
| 6,643,795 | B1 | 11/2003 | Sicola et al. |

(Continued)

FOREIGN PATENT DOCUMENTS

| | | | |
|---|---|---|---|
| CN | 102662803 | A | 9/2012 |
| CN | 103106048 | A | 5/2013 |

(Continued)

*Primary Examiner* — Joshua P Lottich
(74) *Attorney, Agent, or Firm* — Conley Rose, P.C.

(57) ABSTRACT

A method is applied to a system including a host cluster and at least one pair of storage arrays. The host cluster includes a quorum host, which includes a quorum unit. The quorum host is an application host having a quorum function. A pair of storage arrays includes a first storage array and a second storage array. The quorum host receives a quorum request, temporarily stops delivering a service to the first storage array and the second storage array, determines, from the first storage array and the second storage array, which is a quorum winning storage array and which is a quorum losing storage array according to logic judgment, stops the service with the quorum losing storage array, sends quorum winning information to the quorum winning storage array, and resumes the delivered service between the host cluster and the quorum winning storage array.

20 Claims, 3 Drawing Sheets

Related U.S. Application Data continuation of application No. 15/892,003, filed on Feb. 8, 2018, now Pat. No. 10,671,498, which is a continuation of application No. PCT/CN2016/087915, filed on Jun. 30, 2016.

(52) U.S. Cl.
CPC ........ *G06F 11/2069* (2013.01); *G06F 3/0683* (2013.01); *G06F 11/2064* (2013.01); *G06F 11/2071* (2013.01)

(56) References Cited

U.S. PATENT DOCUMENTS

| | | |
|---|---|---|
| 6,859,811 B1 | 2/2005 | Agarwal |
| 7,120,821 B1 | 10/2006 | Skinner et al. |
| 8,108,715 B1 | 1/2012 | Chandrasekaran et al. |
| 8,726,067 B1 | 5/2014 | Van Der Goot |
| 10,606,715 B2 | 3/2020 | Akirav et al. |
| 2002/0095470 A1 | 7/2002 | Cochran et al. |
| 2015/0370659 A1 | 12/2015 | Pershin et al. |
| 2015/0370660 A1 | 12/2015 | Pershin et al. |
| 2016/0328302 A1 | 11/2016 | Bissett et al. |
| 2017/0116095 A1 | 4/2017 | Schatz et al. |
| 2017/0270015 A1 | 9/2017 | Chen et al. |

FOREIGN PATENT DOCUMENTS

| | | |
|---|---|---|
| CN | 103607310 A | 2/2014 |
| CN | 103684941 A | 3/2014 |
| CN | 104469699 A | 3/2015 |
| CN | 105426275 A | 3/2016 |
| EP | 1274012 A2 | 1/2003 |
| EP | 1704480 A2 | 9/2006 |
| WO | 2005071575 A2 | 8/2005 |

METHOD AND APPARATUS FOR REDUNDANCY IN ACTIVE-ACTIVE CLUSTER SYSTEM

CROSS-REFERENCE TO RELATED APPLICATIONS

This application is a continuation application of U.S. patent application Ser. No. 16/839,205, filed on Apr. 3, 2020, now U.S. Pat. No. 11,194,679, which is a continuation of U.S. patent application Ser. No. 15/892,003, filed on Feb. 8, 2018, now U.S. Pat. No. 10,671,498, which is a continuation of International Patent Application No. PCT/CN2016/087915, filed on Jun. 30, 2016, which claims priority to Chinese Patent Application No. 201510727389.4, filed on Oct. 30, 2015. All of the aforementioned patent applications are hereby incorporated by reference in their entireties.

TECHNICAL FIELD

The present disclosure relates to the field of communications technologies, and in particular, to a method and an apparatus for redundancy in an active-active (AA) cluster system.

BACKGROUND

AA is mainly applied to redundancy and backup of data in an AA cluster system. The AA cluster system includes a host cluster, several storage arrays, and a quorum server. For example, the several storage arrays include a storage array A and a storage array B. When the AA cluster system normally runs, the host cluster may deliver read/write services both to the storage array A and the storage array B. When the host cluster needs to deliver a write service to the storage array A, a host in the cluster system first delivers write data to the storage array A, and then the storage array A writes the delivered data both to the storage array A and the storage array B. After the data write to both the storage array A and the storage array B is completed, the storage array A returns data write completion to the host. A data write process of the host cluster on the storage array B is similar to the foregoing basic procedure. When split-brain occurs in the storage array A and the storage array B, that is, a communication fault occurs between the storage array A and the storage array B, one storage array in the AA cluster system may automatically take over the service to avoid service downtime and a data loss. For example, the host delivers data to the storage array A, a communication fault occurs between the storage array A and the storage array B, and the storage array A and the storage array B separately initiate a quorum request to the quorum server after the fault is detected. The quorum server determines, according to logic judgment to enable the storage array A to take over the service, and returns quorum results in response to the storage array A and the storage array B. Although it is determined that the storage array A takes over the service, the data delivered by the host to the storage array A is not synchronized to the storage array B because of the fault between the storage array A and the storage array B. If the storage array B is not disconnected from the host when the storage array A takes over the service, data that is read by the host from the storage array B is erroneous data, resulting in input/output (I/O) fencing. In other approaches, to ensure data consistency between the storage array A and the storage array B, an agreement is made between the storage array A and the storage array B using software, and it is required that the storage array B should stop the service before the storage array A unilaterally provides a service. For example, it is agreed that, when detecting that the storage array B cannot perform communication, the storage array A can receive the service only after 10 seconds to ensure that the storage array B has stopped the service before the storage array A unilaterally provides a service.

In other approaches, there are at least the following problems. In other approaches, there is a strict requirement on a time sequence of the storage array A and the storage array B. However, during actual running of the storage arrays, there are some uncontrollable factors. For example, the storage array B cannot stop the service in time because of excessive system central processing unit (CPU) usage, a network latency, or the like. As a result, out-of-order of a time sequence and data inconsistency between the storage arrays occur, causing I/O fencing.

SUMMARY

Embodiments of the present disclosure provide a method and an apparatus for redundancy in an AA cluster system to resolve a problem that a storage array B cannot stop a service in time because of uncontrollable factors during actual running of storage arrays. As a result, out-of-order of a time sequence and data inconsistency between the storage arrays occur, causing I/O fencing.

To achieve the foregoing objective, the following technical solutions are used in the embodiments of the present disclosure.

According to a first aspect, an embodiment of the present disclosure provides a method for redundancy in an AA cluster system, applied to a system including a host cluster and at least one pair of storage arrays, where the host cluster includes a quorum host, the quorum host includes a quorum unit, the quorum host is an application host having a quorum function, and the at least one pair of storage arrays includes a first storage array and a second storage array, and the method includes receiving, by the quorum host, a quorum request, where the quorum request is sent by the first storage array or the second storage array when detecting that a peer storage array is faulty, temporarily stopping, by the quorum host, delivering a service to the first storage array and the second storage array, determining, by the quorum host from the first storage array and the second storage array, which is a quorum winning storage array and which is a quorum losing storage array according to logic judgment, stopping, by the quorum host, the service with the quorum losing storage array, sending, by the quorum host, quorum winning information to the quorum winning storage array such that the quorum winning storage array changes a manner of receiving write data from a manner of synchronizing write local and the remote storage array into a manner of only write local, and resuming, by the quorum host, the delivered service between the host cluster and the quorum winning storage array.

With reference to the first aspect, in a first implementation of the first aspect, the host cluster further includes at least one application host, and receiving, by the quorum host, a quorum request includes receiving, by the quorum host, the quorum request sent by the at least one application host, where the quorum request sent by the at least one application host is forwarded by the at least one application host after receiving the quorum request sent by the first storage array or the second storage array.

With reference to the first implementation of the first aspect, in a second implementation of the first aspect, before the quorum host sends a notification to the quorum winning storage array, the method further includes sending, by the quorum host, a first instruction to the at least one application host, where the first instruction is used to instruct the at least one application host to temporarily stop delivering the service to the first storage array and the second storage array, and receiving, by the quorum host, response information of the at least one application host, where the response information is used to indicate that the at least one application host stops the service with the quorum losing storage array, and after resuming, by the quorum host, the delivered service between the host cluster and the quorum winning storage array, the method further includes sending, by the quorum host, a second instruction to the at least one application host, where the second instruction is used to instruct to resume the delivered service between the at least one application host and the quorum winning storage array.

With reference to the first aspect, in a third implementation of the first aspect, after resuming, by the quorum host, the delivered service between the host cluster and the quorum winning storage array, the method further includes receiving a service resumption request of the quorum losing storage array, and resuming, by the quorum host, the delivered service with the quorum losing storage array.

With reference to the third implementation of the first aspect, in a fourth implementation of the first aspect, the host cluster further includes at least one application host, and receiving a service resumption request of the quorum losing storage array includes receiving the service resumption request sent by the at least one application host, where the service resumption request sent by the at least one application host is sent by the at least one application host after receiving the service resumption request sent by the quorum losing storage array.

With reference to a fourth implementation of the first aspect, in a fifth implementation of the first aspect, after resuming, by the quorum host, the delivered service with the quorum losing storage array, the method further includes sending, by the quorum host, a third instruction to the at least one application host, where the third instruction is used to instruct the at least one application host to resume the delivered service with the quorum losing storage array.

According to a second aspect, an embodiment of the present disclosure provides an apparatus for redundancy in an AA cluster system, where the apparatus includes a host cluster and at least one pair of storage arrays, the host cluster includes a quorum host, the quorum host includes a quorum unit, the quorum host is an application host having a quorum function, the at least one pair of storage arrays includes a first storage array and a second storage array, and the quorum host further includes a receiving unit, a suspension unit, a determining unit, a stopping unit, a sending unit, and a resumption unit. The receiving unit is configured to receive a quorum request, where the quorum request is sent by the first storage array or the second storage array when detecting that a peer storage array is faulty. The suspension unit is configured to temporarily stop delivering a service to the first storage array and the second storage array. The determining unit is configured to determine, from the first storage array and the second storage array, which is a quorum winning storage array and which is a quorum losing storage array according to logic judgment. The stopping unit is configured to stop the service with the quorum losing storage array. The sending unit is configured to send quorum winning information to the quorum winning storage array such that the quorum winning storage array changes a manner of receiving write data from a manner of synchronizing write local and the remote storage array into a manner of only write local, and the resumption unit is configured to resume the delivered service between the host cluster and the quorum winning storage array.

With reference to the second aspect, in a first implementation of the second aspect, the host cluster further includes at least one application host, and the receiving unit is further configured to receive the quorum request sent by the at least one application host, where the quorum request sent by the at least one application host is forwarded by the at least one application host after receiving the quorum request sent by the first storage array or the second storage array.

With reference to the first implementation of the second aspect, in a second implementation of the second aspect, the sending unit is further configured to send a first instruction to the at least one application host, where the first instruction is used to instruct the at least one application host to temporarily stop delivering the service to the first storage array and the second storage array. The receiving unit is further configured to receive response information of the at least one application host, where the response information is used to indicate that the at least one application host stops delivering the service to the second storage array, and the sending unit is further configured to send a second instruction to the at least one application host, where the second instruction is used to instruct to resume the delivered service between the at least one application host and the quorum winning storage array.

With reference to the second aspect, in a third implementation of the second aspect, the receiving unit is further configured to receive a service resumption request of the quorum losing storage array, and the resumption unit is further configured to resume the delivered service with the quorum losing storage array.

With reference to the third implementation of the second aspect, in a fourth implementation of the second aspect, the host cluster further includes at least one application host, and the receiving unit is further configured to receive the service resumption request sent by the at least one application host, where the service resumption request sent by the at least one application host is sent by the at least one application host after receiving the service resumption request sent by the quorum losing storage array.

With reference to the fourth implementation of the second aspect, in a fifth implementation of the second aspect, the sending unit is further configured to send a third instruction to the at least one application host, where the third instruction is used to instruct the at least one application host to resume the delivered service with the quorum losing storage array.

According to the method and the apparatus for redundancy in an AA cluster system provided in the embodiments of the present disclosure, in the embodiments of the present disclosure, the quorum host is an application host having a quorum function. The quorum unit is disposed in the quorum host, and may implement a quorum function of a quorum server in other approaches. When detecting that the peer storage array is faulty, the first storage array and the second storage array separately send a quorum request to the quorum host. After receiving the quorum request, the quorum host temporarily stops delivering a service to the first storage array and the second storage array. After determining a quorum result, the quorum host stops the service with the quorum losing storage array, and resumes the delivered service between the host cluster and the quorum winning storage array to avoid that when a communication fault occurs between the first storage array and the second storage array, I/O fencing is caused by data inconsistency because service data delivered by the quorum or application host to the first storage array or the second storage array cannot be synchronized before a quorum result is determined. In addition, there is a strict requirement on a time sequence of a storage array A and a storage array B during implementation of the embodiments of the present disclosure to avoid the I/O fencing caused by out-of-order of a time sequence and data inconsistency between the storage arrays due to uncontrollable factors during actual running of the storage arrays.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the advantages of the technical solutions of the present disclosure clearer, the following describes the present disclosure in detail with reference to the accompanying drawings and embodiments.

Figure 1:
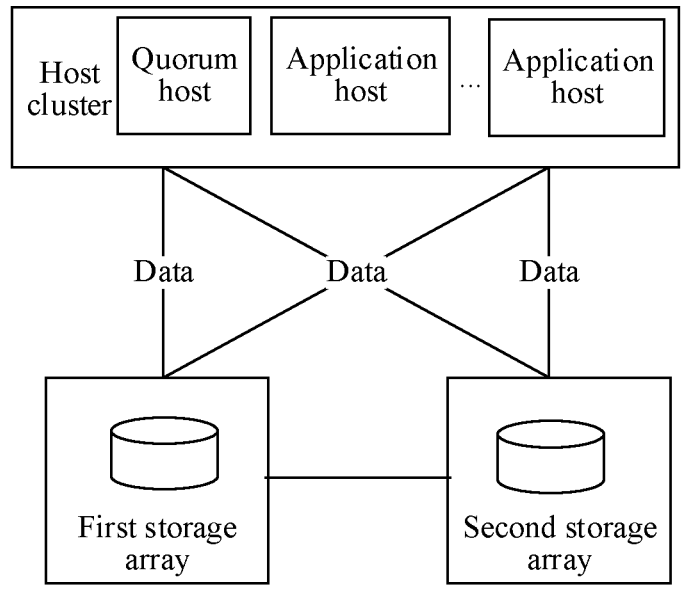
FIG. 1 is a schematic diagram of an architecture according to an embodiment of the present disclosure.

The embodiments of the present disclosure are applicable to an AA cluster system. The system includes a host cluster and at least one pair of storage arrays. The host cluster includes a quorum host, and the quorum host is an application host having a quorum function. Because the quorum host includes a quorum unit, the quorum host has the quorum function. For example, as shown in FIG. 1, a host cluster includes a quorum host and at least one application host. A pair of storage arrays includes a first storage array and a second storage array. Hosts (including the quorum host and the application host) in the host cluster may communicate with each other, and the hosts may be separately connected to the first storage array and the second storage array. The first storage array and the second storage array are connected and may perform data communication. Alternatively, the host cluster may include only the quorum host, and a communication manner of the host cluster is the same as that in FIG. 1.

Figure 2:
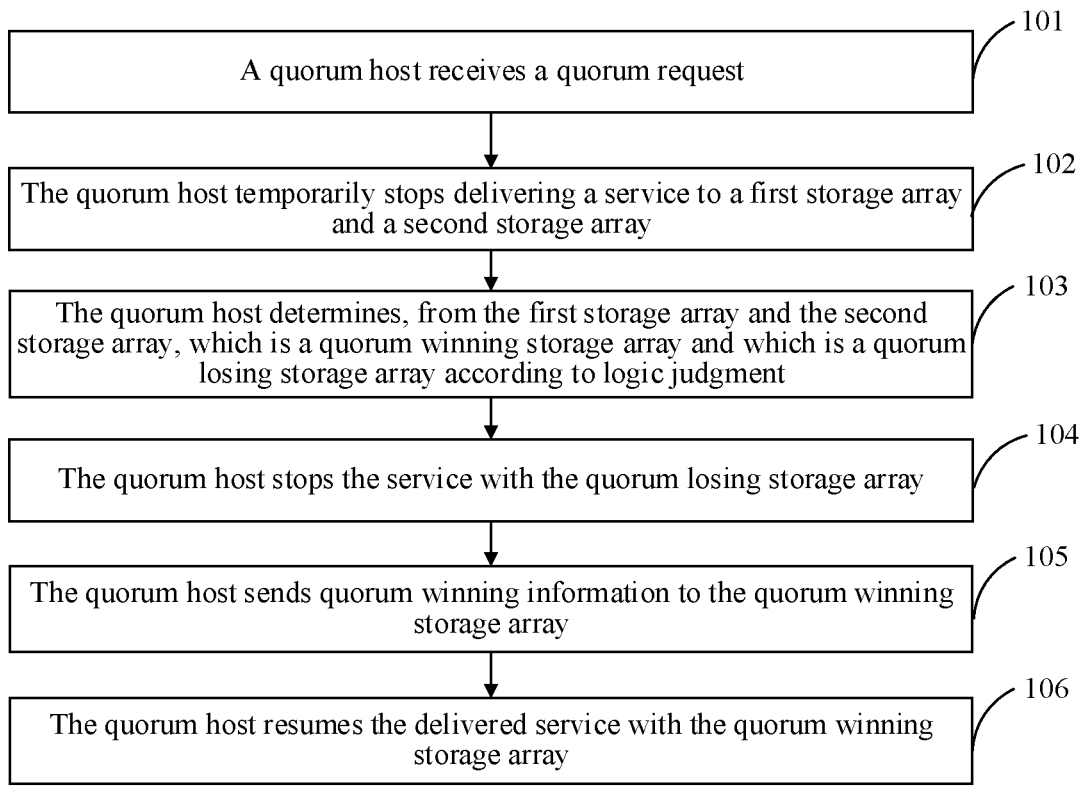
FIG. 2 is a flowchart of a method according to an embodiment of the present disclosure.

An embodiment of the present disclosure provides a method for redundancy in an AA cluster system. As shown in FIG. 2, the method includes the following steps.

Step 101: A quorum host receives a quorum request.

The quorum request is sent by a first storage array or a second storage array when detecting that a peer storage array is faulty.

Step 102: The quorum host temporarily stops delivering a service to a first storage array and a second storage array.

Step 103: The quorum host determines, from the first storage array and the second storage array, which is a quorum winning storage array and which is a quorum losing storage array according to logic judgment.

Step 104: The quorum host stops the service with the quorum losing storage array.

Step 105: The quorum host sends quorum winning information to the quorum winning storage array.

The quorum host sends the quorum winning information to the quorum winning storage array such that the quorum winning storage array changes a manner of receiving write data from a manner of synchronizing write local and the remote storage array into a manner of only write local. If the manner of receiving write data is the manner of synchronizing write local and the remote storage array, it indicates that a write service delivered by the host needs to be synchronized to the second storage array, if the manner of receiving write data is a status of only write local, it indicates that a write service delivered by the host only needs to be written locally.

Step 106: The quorum host resumes the delivered service with the quorum winning storage array.

It should be noted that, for the quorum host in this embodiment of the present disclosure, an application host may be selected from a host cluster and used as the quorum host, or a quorum host may be added to the host cluster. Alternatively, there may be two or more quorum hosts in this embodiment of the present disclosure, one quorum host is used as a quorum host during normal running, and one or more other quorum hosts are used as standby quorum hosts. When the quorum host during normal running is faulty, a standby quorum host may be selected to perform a corresponding operation. A manner in which an application host is selected from the host cluster and used as the quorum host may be any manner, and is not limited herein.

It should be noted that, in this embodiment of the present disclosure, the application host in the application host cluster may be directly used as the quorum host without configuring a quorum server. Therefore, costs are reduced, deployment is simpler, a fault domain is reduced, a single point of failure of the quorum server in other approaches is avoided, and system reliability is improved. In addition, a quorum function is integrated into the host. Therefore, system complexity and maintenance costs are reduced, a quorum misjudgment problem due to the fact that services of the quorum server and the host are not on a same network may also be avoided, and networking is more flexible. According to this embodiment of the present disclosure, the following problem can be resolved. Because the first and the second storage arrays in the AA cluster system become two independent operating systems through split-brain due to inter-array link interruption, the two independent storage arrays may simultaneously provide services in a short time, causing data inconsistency.

In this embodiment of the present disclosure, the quorum unit is disposed in the quorum host. The quorum host is an application host having a quorum function, and may implement a quorum function of a quorum server. When detecting that the peer storage array is faulty, the first storage array and the second storage array separately send a quorum request to the quorum host. After receiving the quorum request, the quorum host temporarily stops delivering a service to the first storage array and the second storage array. After determining a quorum result, the quorum host stops the service with the quorum losing storage array, and resumes the delivered service between the host cluster and the quorum winning storage array, to avoid that when a communication fault occurs between the first storage array and the second storage array, I/O fencing is caused by data inconsistency because service data delivered by the quorum or application host to the first storage array or the second storage array cannot be synchronized before a quorum result is determined. In addition, there is a strict requirement on a time sequence of a storage array A and a storage array B during implementation of this embodiment of the present disclosure to avoid the I/O fencing caused by out-of-order of a time sequence and data inconsistency between the storage arrays due to uncontrollable factors during actual running of the storage arrays.

Figure 3:
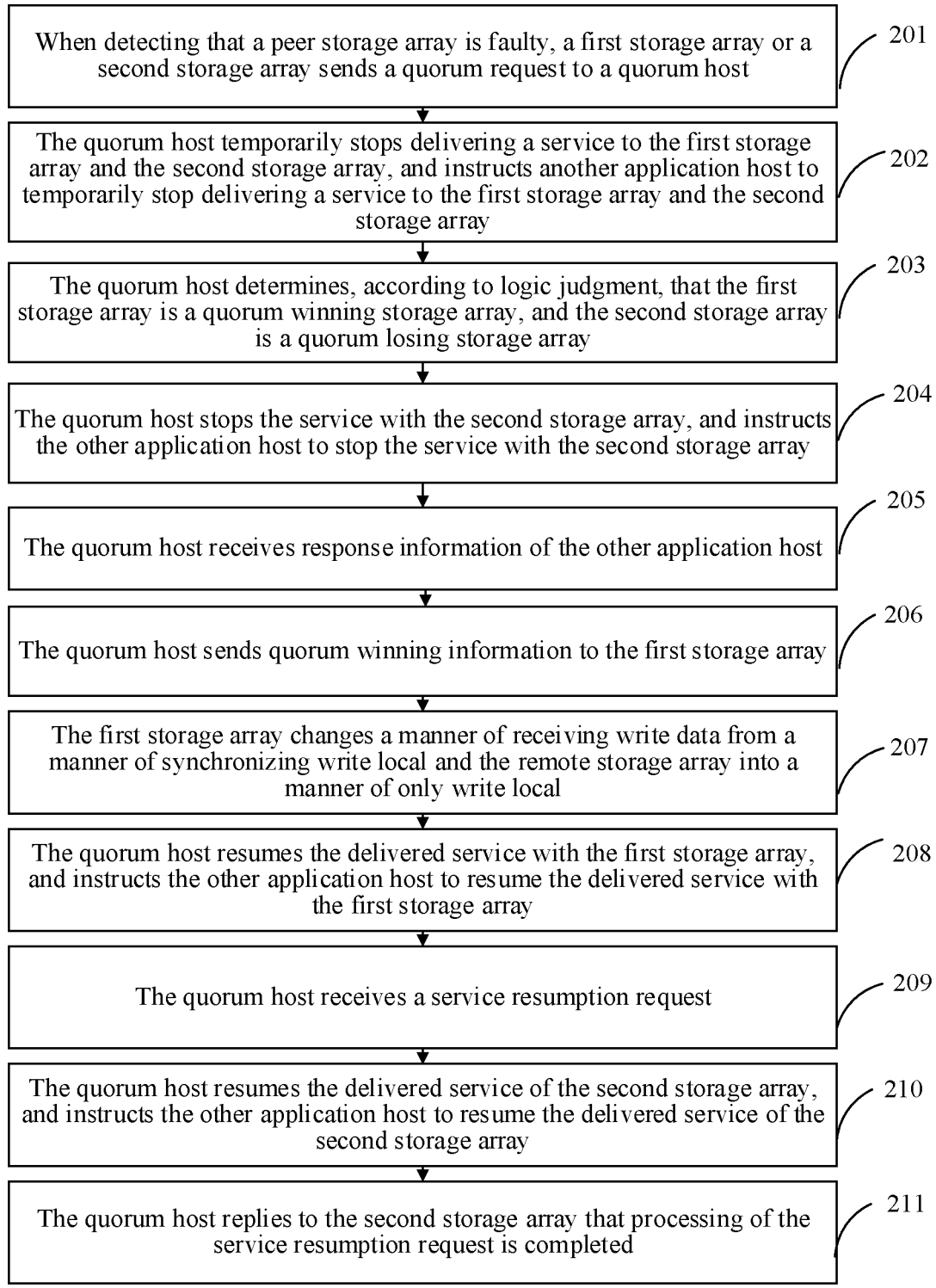
FIG. 3 is a flowchart of a method according to another embodiment of the present disclosure.

Another embodiment of the present disclosure provides a method for redundancy in an AA cluster system. As shown in FIG. 3, the method includes the following steps.

Step 201: When detecting that a peer storage array is faulty, a first storage array or a second storage array sends a quorum request to a quorum host.

The quorum request sent by the first storage array or the second storage array may be sent to the quorum host in a host cluster, or may be sent to another host that the second storage array or the second storage array is connected to and communicates with, and after receiving the quorum request sent by the first storage array or the second storage array, the other host forwards the quorum request to the quorum host.

Step 202: The quorum host temporarily stops delivering a service to the first storage array and the second storage array, and instructs another application host to temporarily stop delivering a service to the first storage array and the second storage array.

When the host cluster includes only the quorum host, the quorum host also implements a function of the application host without instructing another application host to temporarily stop delivering the service to the first storage array and the second storage array.

It should be noted that, according to this step, a problem of data inconsistency due to the fact that a host having a function of an application host in the host cluster delivers a service to the first storage array and the second storage array in this period in which the quorum or application host does not determine a quorum result when a communication fault occurs between the first storage array and the second storage array.

Step 203: The quorum host determines, according to logic judgment, that the first storage array is a quorum winning storage array, and the second storage array is a quorum losing storage array.

The quorum host determines, from the first storage array and the second storage array, which is a quorum winning storage array and which is a quorum losing storage array according to the logic judgment. In this embodiment of the present disclosure, for example, the first storage array is the quorum winning storage array, and the second storage array is the quorum losing storage array. A method for performing the logic judgment by the quorum host is not limited herein.

Step 204: The quorum host stops the service with the second storage array, and instructs the other application host to stop the service with the second storage array.

The stopping the service with the second storage array in this step may be stopping the service with the second storage array in terms of software to prevent the second storage array from contacting with a host having a function of the application host when there is a fault between the second storage array and the first storage array. When the host cluster includes only the quorum host, there is no need to instruct another application host to stop the service with the second storage array.

Step 205: The quorum host receives response information of the other application host.

The response information is used to indicate that the other application host stops the service with the second storage array.

Step 206: The quorum host sends quorum winning information to the first storage array.

The quorum winning information indicates that the first storage array takes over the service with the host cluster when a fault occurs between the first storage array and the second storage array.

Step 207: The first storage array changes a manner of receiving write data from a manner of synchronizing write local and the remote storage array into a manner of only write local.

If the manner of write data is the manner of synchronizing write local and the remote storage array, it indicates that a write service delivered by the host needs to be synchronized to the second storage array, and if the manner of write data is a status of only write local, it indicates that a write service delivered by the host only needs to be written locally.

Step 208: The quorum host resumes the delivered service with the first storage array, and instructs the other application host to resume the delivered service with the first storage array.

When the host cluster includes only the quorum host, there is no need to instruct another application host to resume the delivered service with the first storage array.

It should be noted that, in the foregoing steps, a quorum process corresponding to the period during which the fault occurs between the first storage array and the second storage array is completed, and a manner of processing data after the quorum is performed is determined. When communication between the first storage array and the second storage array is resumed, the first storage array first needs to synchronize different data corresponding to the fault period to the second storage array, and changes the manner of receiving write data from the manner of only write local into the manner of synchronizing write local and the remote storage array. After completing the operations, the first storage array replies to the second storage array that the operations are completed. After receiving the reply of the first storage array, the second storage array initiates a service resumption request to the quorum host.

Step 209: The quorum host receives a service resumption request.

The service resumption request sent by the second storage array may be sent to the quorum host in the host cluster, or may be sent to another application host that the second storage array is connected to and communicates with, and after receiving the service resumption request sent by the second storage array, the other application host forwards the service resumption request to the quorum host.

Step 210: The quorum host resumes the delivered service with the second storage array, and instructs the other application host to resume the delivered service with the second storage array.

When the host cluster includes only the quorum host, there is no need to instruct another application host to resume the delivered service with the second storage array.

Step 211: The quorum host replies to the second storage array that processing of the service resumption request is completed.

After this step, a normal data processing process is resumed for the first storage array and the second storage array.

In this embodiment of the present disclosure, the quorum unit is disposed in the quorum host. The quorum host is an application host having a quorum function, and may implement a quorum function of a quorum server. When detecting that the peer storage array is faulty, the first storage array and the second storage array separately send a quorum request to the quorum host. After receiving the quorum request, the quorum host temporarily stops delivering a service to the first storage array and the second storage array. After determining a quorum result, the quorum host stops the service with the quorum losing storage array, and resumes the delivered service between the host cluster and the quorum winning storage array to avoid that when a communication fault occurs between the first storage array and the second storage array, I/O fencing is caused by data inconsistency because service data delivered by the quorum or application host to the first storage array or the second storage array cannot be synchronized before a quorum result is determined. In addition, there is a strict requirement on a time sequence of a storage array A and a storage array B during implementation of this embodiment of the present disclosure to avoid the I/O fencing caused by out-of-order of a time sequence and data inconsistency between the storage arrays due to uncontrollable factors during actual running of the storage arrays.

Figure 4:
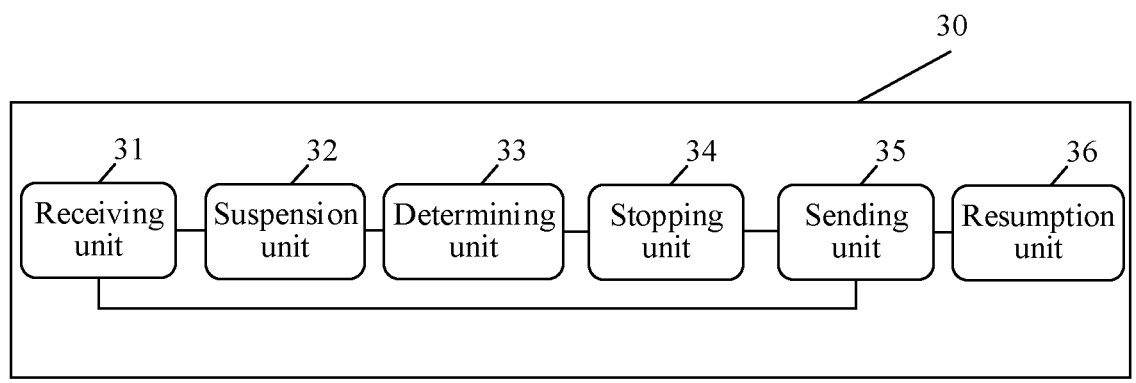
FIG. 4 is a schematic structural diagram of an apparatus according to another embodiment of the present disclosure.

Another embodiment of the present disclosure provides an apparatus 30 for redundancy in an AA cluster system. As shown in FIG. 4, the apparatus 30 includes a host cluster (not shown) and at least one pair of storage arrays (not shown). The host cluster includes a quorum host, the quorum host includes a quorum unit, and the quorum host is an application host having a quorum function. The at least one pair of storage arrays includes a first storage array and a second storage array. The quorum host further includes a receiving unit 31, a suspension unit 32, a determining unit 33, a stopping unit 34, a sending unit 35, and a resumption unit 36.

The receiving unit 31 is configured to receive a quorum request, where the quorum request is sent by the first storage array or the second storage array when detecting that a peer storage array is faulty.

The suspension unit 32 is configured to temporarily stop delivering a service to the first storage array and the second storage array.

The determining unit 33 is configured to determine, from the first storage array and the second storage array, which is a quorum winning storage array and which is a quorum losing storage array according to logic judgment.

The stopping unit 34 is configured to stop the service with the quorum losing storage array.

The sending unit 35 is configured to send quorum winning information to the quorum winning storage array such that the quorum winning storage array changes a manner of receiving write data from a manner of synchronizing write local and the remote storage array into a manner of only write local.

The resumption unit 36 is configured to resume the delivered service between the host cluster and the quorum winning storage array.

The host cluster further includes at least one application host.

The receiving unit 31 is further configured to receive a quorum request sent by the first storage array or the second storage array.

The host cluster further includes at least one application host. The receiving unit 31 is further configured to receive the quorum request sent by the at least one application host, where the quorum request sent by the at least one application host is forwarded by the at least one application host after receiving the quorum request sent by the first storage array or the second storage array.

The host cluster further includes at least one application host. The sending unit 35 is further configured to send a first instruction to the at least one application host, where the first instruction is used to instruct the at least one application host to temporarily stop delivering the service to the first storage array and the second storage array.

The receiving unit 31 is further configured to receive response information of the at least one application host, where the response information is used to indicate that the at least one application host stops delivering the service to the second storage array.

The sending unit 35 is further configured to send a second instruction to the at least one application host, where the second instruction is used to instruct to resume the delivered service between the at least one application host and the quorum winning storage array.

The receiving unit 31 is further configured to receive a service resumption request of the quorum losing storage array.

The resumption unit 36 is further configured to resume the delivered service with the quorum losing storage array.

The receiving unit 31 is further configured to receive the service resumption request sent by the quorum losing storage array.

The host cluster further includes at least one application host. The receiving unit 31 is further configured to receive the service resumption request sent by the at least one application host, where the service resumption request sent by the at least one application host is sent by the at least one application host after receiving the service resumption request sent by the quorum losing storage array.

The sending unit 35 is further configured to send a third instruction to the at least one application host, where the third instruction is used to instruct the at least one application host to resume the delivered service with the quorum losing storage array.

In this embodiment of the present disclosure, the quorum unit is disposed in the quorum host. The quorum host is an application host having a quorum function, and may implement a quorum function of a quorum server in other approaches. When detecting that the peer storage array is faulty, the first storage array and the second storage array separately send a quorum request to the quorum host. After receiving the quorum request, the quorum host temporarily stops delivering a service to the first storage array and the second storage array. After determining a quorum result, the quorum host stops the service with the quorum losing storage array, and resumes the delivered service between the host cluster and the quorum winning storage array to avoid that when a communication fault occurs between the first storage array and the second storage array, I/O fencing is caused by data inconsistency because service data delivered by the quorum or application host to the first storage array or the second storage array cannot be synchronized before a quorum result is determined. In addition, there is a strict requirement on a time sequence of a storage array A and a storage array B during implementation of this embodiment of the present disclosure, to avoid the I/O fencing caused by out-of-order of a time sequence and data inconsistency between the storage arrays due to uncontrollable factors during actual running of the storage arrays.

Figure 5:
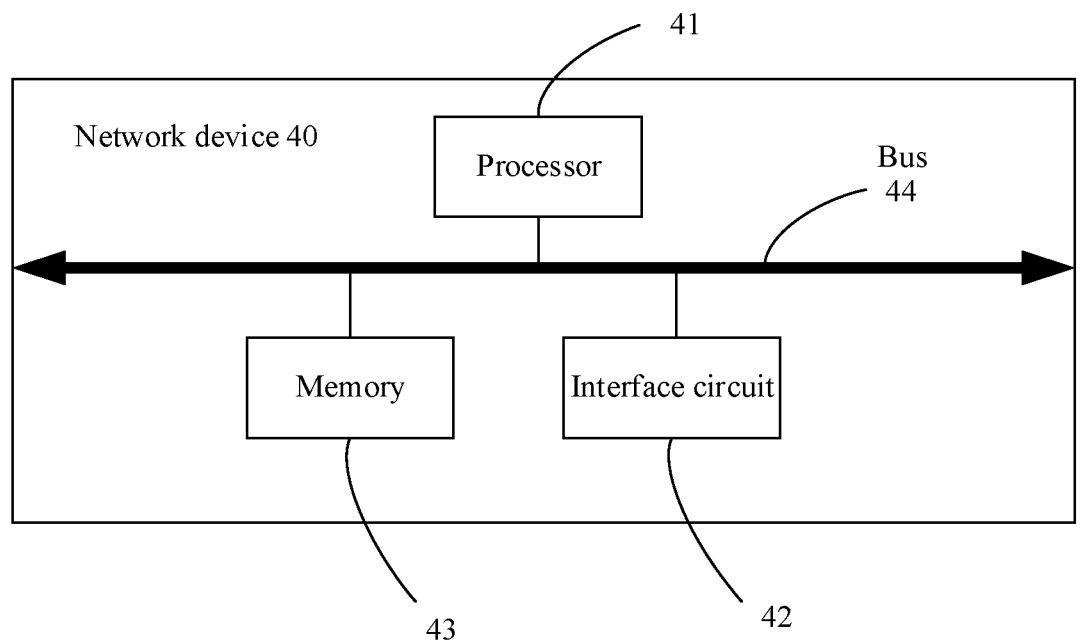
FIG. 5 is a schematic structural diagram of a network device according to another embodiment of the present disclosure.

Another embodiment of the present disclosure provides a network device 40 for redundancy in an AA cluster system, and the network device 40 is applied to a system including a host cluster and at least one pair of storage arrays. The host cluster includes a quorum host, and the quorum host includes a quorum unit. The at least one pair of storage arrays includes a first storage array and a second storage array. In this embodiment of the present disclosure, the network device 40 is used as the quorum host. As shown in FIG. 5, the network device 40 includes a processor 41 and an interface circuit 42. FIG. 5 further shows a memory 43 and a bus 44. The processor 41, the interface circuit 42, and the memory 43 are connected and communicate with each other using the bus 44.

It should be noted that, the processor 41 herein may be one processing element or may be a collective name of multiple processing elements. For example, the processing element may be a CPU, may be an Application-Specific Integrated Circuit (ASIC), or may be one or more integrated circuits configured to implement this embodiment of the present disclosure, such as one or more digital signal processor (DSP) or one or more Field Programmable Gate Array (FPGA).

The memory 43 may be one storage apparatus or may be a collective name of multiple storage elements, and is configured to store executable program code or a parameter, data, and the like required for running of an access network management device. In addition, the memory 43 may include a random access memory (RAM), or may include a non-volatile memory such as a magnetic disk memory or a flash memory (Flash).

The bus 44 may be an industry standard architecture (ISA) bus, a Peripheral Component Interconnect (PCI) bus, an Extended ISA (EISA) bus, or the like. The bus 44 may be classified into an address bus, a data bus, a control bus, and the like. For ease of representation, only one bold line is used for representation in FIG. 5, but it does not indicate that there is only one bus or one type of bus.

The network device 40 may further include an I/O apparatus (not shown) that is connected to the bus 44 such that the I/O apparatus is connected to another part such as the processor 41 using the bus 44.

The processor 41 calls the program code in the memory 43 to implement the operations performed by the network device 40 in the foregoing embodiment.

The processor 41 is further configured to receive a quorum request using the interface circuit 42, where the quorum request is sent by the first storage array or the second storage array when detecting that a peer storage array is faulty, temporarily stop delivering a service to the first storage array and the second storage array, determine, from the first storage array and the second storage array, which is a quorum winning storage array and which is a quorum losing storage array according to logic judgment, stop the service with the quorum losing storage array, send quorum winning information to the quorum winning storage array using the interface circuit 42 such that the quorum winning storage array changes a manner of receiving write data from a manner of synchronizing write local and the remote storage array into a manner of only write local, and resume the delivered service between the host cluster and the quorum winning storage array.

In an implementation of this embodiment of the present disclosure, the processor 41 is further configured to receive, using the interface circuit 42, the quorum request sent by the first storage array or the second storage array.

The host cluster further includes at least one application host.

In another implementation of this embodiment of the present disclosure, the host cluster further includes at least one application host. The processor 41 is further configured to receive, using the interface circuit 42, the quorum request sent by the at least one application host, where the quorum request sent by the at least one application host is forwarded by the at least one application host after receiving the quorum request sent by the first storage array or the second storage array.

In another implementation of this embodiment of the present disclosure, the host cluster further includes at least one application host. The processor 41 is further configured to send a first instruction to the at least one application host using the interface circuit 42, where the first instruction is used to instruct the at least one application host to temporarily stop delivering the service to the first storage array and the second storage array, receive response information of the at least one application host using the interface circuit 42, where the response information is used to indicate that the at least one application host stops delivering the service to the second storage array, and send a second instruction to the at least one application host using the interface circuit 42, where the second instruction is used to instruct to resume the delivered service between the at least one application host and the quorum winning storage array.

In another implementation of this embodiment of the present disclosure, the processor 41 is further configured to receive a service resumption request of the quorum losing storage array using the interface circuit 42, and resume the delivered service with the quorum losing storage array.

In another implementation of this embodiment of the present disclosure, the processor 41 is further configured to receive, using the interface circuit 42, the service resumption request sent by the quorum losing storage array.

In another implementation of this embodiment of the present disclosure, the host cluster further includes at least one application host. The processor 41 is further configured to receive, using the interface circuit 42, the service resumption request sent by the at least one application host, where the service resumption request sent by the at least one application host is sent by the at least one application host after receiving the service resumption request sent by the quorum losing storage array.

In another implementation of this embodiment of the present disclosure, the processor 41 is further configured to send a third instruction to the at least one application host using the interface circuit 42, where the third instruction is used to instruct the at least one application host to resume the delivered service with the quorum losing storage array.

In this embodiment of the present disclosure, the quorum unit is disposed in the network device 40. The network device 40 is an application host having a quorum function, and may implement a quorum function of a quorum server in other approaches. When detecting that the peer storage array is faulty, the first storage array and the second storage array separately send a quorum request to the quorum host. After receiving the quorum request, the network device 40 temporarily stops delivering a service to the first storage array and the second storage array. After determining a quorum result, the network device 40 stops the service with the quorum losing storage array, and resumes the delivered service between the host cluster and the quorum winning storage array to avoid that when a communication fault occurs between the first storage array and the second storage array, I/O fencing is caused by data inconsistency because service data delivered by the quorum or application host to the first storage array or the second storage array cannot be synchronized before a quorum result is determined. In addition, there is a strict requirement on a time sequence of a storage array A and a storage array B during implementation of this embodiment of the present disclosure, to avoid the I/O fencing caused by out-of-order of a time sequence and data inconsistency between the storage arrays due to uncontrollable factors during actual running of the storage arrays.

The apparatus for redundancy in an AA cluster system provided in this embodiment of the present disclosure may implement the method embodiments provided above. For specific function implementation, refer to the descriptions in the method embodiments. Details are not described herein again. The method and the apparatus for redundancy in an AA cluster system provided in the embodiments of the present disclosure may be applicable to a system including a host cluster and at least one pair of storage arrays, but are not merely limited thereto.

A person of ordinary skill in the art may understand that all or some of the procedures for the methods in the embodiments may be implemented by a computer program instructing relevant hardware. The program may be stored in a computer readable storage medium. When the program runs, the procedures for the method embodiments may be performed. The foregoing storage medium may be a magnetic disk, an optical disc, a read-only memory (ROM), a RAM, or the like.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An active-active (AA) storage system, comprising:
   a first host configured to run a first quorum host having first quorum instances;
   a first storage array coupled to the first host; and
   a second storage array coupled to the first host and the first storage array,
   wherein a first volume in the first storage array and a second volume in the second storage array form an AA pair,
   wherein the first storage array is configured to send a first quorum request for the AA pair to a quorum instance in the first quorum instances when the first storage array fails to contact the second storage array,
   wherein the second storage array is configured to send a second quorum request to the quorum instance at a later time than the first storage array sends the first quorum request, and
   wherein the quorum instance is configured to grant the first storage array to be a winner based on the first quorum request and the second quorum request.

2. The AA storage system of claim 1, wherein the AA storage system does not comprise a physical quorum server to implement the first quorum request or the second quorum request.

3. The AA storage system of claim 1, wherein the AA storage system further comprises a second host running second quorum instances.

4. The AA storage system of claim 3, wherein the second host is redundant to the first host.

5. The AA storage system of claim 1, wherein the first storage array comprises a local disk, and wherein the first storage array is further configured to store data into the local disk.

6. The AA storage system of claim 1, wherein the second storage array is further configured to send a service resumption request to the first host when the second storage array is enabled to contact the first storage array.

7. The AA storage system of claim 1, wherein the quorum instance is configured to send to the first storage array a grant message that indicates the first storage array remains accessible.

8. The AA storage system of claim 1, wherein the quorum instance is configured to send to the second storage array a non-grant message that indicates the second storage array has stopped being inaccessible.

9. A quorum management method in an active-active (AA) storage system, the quorum management method comprising:
   sending, by a first storage array, a first quorum request for an AA storage array pair comprising a volume in the first storage array and a volume in a second storage array to a quorum instance in a plurality of quorum instances when the first storage array fails to contact the second storage array, wherein the AA storage system comprises a first host, the first storage array, and the second storage array, and wherein the first host runs a first quorum host having the quorum instances;
   sending, by the second storage array, a second quorum request to the quorum instance at a later time than the first storage array sends the first quorum request; and
   granting, by the quorum instance, the first storage array to be a winner based on the first quorum request and the second quorum request.

10. The quorum management method of claim 9, wherein the AA storage system does not comprise a physical quorum server to implement the first quorum request or the second quorum request.

11. The quorum management method of claim 9, further comprising providing, by the first host, a second quorum host having a second quorum function.

12. The quorum management method of claim 9, further comprising sending, by the second storage array, a service resumption request to the quorum instance when the second storage array is enabled to contact the first storage array.

13. The quorum management method of claim 9, further comprising sending, by the quorum instance, to the first storage array a grant message indicating that the first storage array remains accessible.

14. The quorum management method of claim 9, further comprising sending, by the quorum instance, to the second storage array a non-grant message indicating that the second storage array has stopped being inaccessible.

15. A non-transitory computer-readable medium comprising computer-executable instructions that when executed by one or more processors, cause a first host to:
- receive, from a first storage array, a first quorum request for an active-active (AA) pair of a volume in the first storage array and a volume in a second storage array to a quorum instance in a plurality of quorum instances when the first storage array fails to contact the second storage array, wherein an AA storage system comprises the first host, the first storage array, and the second storage array, wherein the first host runs a first quorum host having the quorum instances;
- receive, from the second storage array, a second quorum request to the quorum instance at a later time than the first quorum request is received from the first storage array; and
- grant, by the quorum instance, the first storage array to be a winner based on the first quorum request and the second quorum request.

16. The computer-readable medium of claim 15, wherein the AA storage system does not comprise a physical quorum server to implement the first quorum request or the second quorum request.

17. The computer-readable medium of claim 15, wherein the computer-executable instructions further cause the first host to provide a second quorum host having a second quorum function.

18. The computer-readable medium of claim 15, wherein the computer-executable instructions further cause the first host to receive, from the second storage array, a service resumption request to the quorum instance when the second storage array is enabled to contact the first storage array.

19. The computer-readable medium of claim 15, wherein the computer-executable instructions further cause the first host to send, by the quorum instance, a grant message to the first storage array indicating that the first storage array remains accessible.

20. The computer-readable medium of claim 15, wherein the computer-executable instructions further cause the first host to send, by the quorum instance, a non-grant message to the second storage array indicating that the second storage array has stopped being inaccessible.

* * * * *